United States Patent [19]

Thoreson et al.

[11] Patent Number: 4,730,930

[45] Date of Patent: Mar. 15, 1988

[54] SCANNING APPARATUS AND METHOD

[75] Inventors: Robert J. Thoreson; Steven J. White, both of Seattle, Wash.

[73] Assignee: Technical Arts Corporation, Redmond, Wash.

[21] Appl. No.: 878,046

[22] Filed: Jun. 24, 1986

[51] Int. Cl.[4] .................... G06K 11/00; G06K 7/12
[52] U.S. Cl. ................................. 356/407; 356/418; 356/425; 382/17
[58] Field of Search ............... 382/17; 356/418, 425, 356/406, 407; 250/226; 364/519, 526

[56] References Cited

U.S. PATENT DOCUMENTS

| | | | |
|---|---|---|---|
| 3,327,287 | 6/1967 | Ball et al. | 340/15.5 |
| 3,693,178 | 9/1972 | Braun et al. | 346/1 |
| 3,709,612 | 1/1973 | Clemens | 356/407 |
| 3,718,808 | 2/1973 | Kelch et al. | 235/92 |
| 3,809,909 | 5/1974 | Salet et al. | 250/556 |
| 3,829,660 | 8/1974 | Ruhl | 235/61.6 |
| 4,053,734 | 10/1977 | Yasunaga | 235/61.6 |
| 4,086,600 | 4/1978 | McClure et al. | 346/1 |
| 4,099,833 | 7/1978 | Tosswill | 350/96.25 |
| 4,128,755 | 12/1978 | Fairley et al. | 235/92 |
| 4,202,599 | 5/1980 | Tosswill | 350/96.25 |
| 4,280,122 | 7/1981 | McKinley et al. | 340/380 |
| 4,299,443 | 11/1981 | Minami et al. | 350/162 |
| 4,505,589 | 3/1985 | Ott et al. | 356/406 |
| 4,519,017 | 5/1985 | Daniel | 362/32 |
| 4,609,291 | 9/1986 | Takahashi | 356/418 |

OTHER PUBLICATIONS

Installation and Operation Instructions for Micro Scan Models 276, 281 and 282, 1982 UGC Industries, Inc.
Catalog C0303A from Dolan Jenner Industries, Inc., Components for Scanning and Sensing.
Information sheet from UGC, Maloney Pipeline Products Company, showing Micro Scan 276 and Chart Processor Model 285.
"Fiber Optics: Theory and Applications", Technical Memorandum from Galileo-Electro-Optics Corp.
Brochure from Collimated Holes, Inc., "Fiber Optic Products for Creative Engineering".

Primary Examiner—Bruce C. Anderson
Assistant Examiner—Paul A. Guss
Attorney, Agent, or Firm—Christensen, O'Connor Johnson & Kindness

[57] ABSTRACT

A scanner and scanning method for scanning a sheet such as a chart. The scanner includes scanning means and detection means. The scanning means includes means for supporting and mounting the sheet, and illumination means for directing light onto an illuminated area of the sheet, the illuminated area being elongated along a scan direction. The scanning means also includes means for causing the illuminated area to move across the sheet in a movement direction normal the scan direction. The detection means comprises a photodetector array and a coherent fiber optic bundle. The coherent fiber optic is tapered, such that it has a comparatively wide aperture adjacent the illuminated area, and a comparatively small aperture adjacent the photodetector array. In a related aspect, the illuminated area is caused to move in a first direction across the sheet such that the illumination means sequentially directs light onto a series of pixel areas of the sheet. The color of the light is varied such that as the illuminated area moves across the sheet in the first direction, the color of the light alternates between first, second and third illumination colors, thereby alternately illuminating the pixel areas with the illumination colors. An illumination color signal is produced for each pixel area. The processing means detects light reflected from each pixel area to produce an intensity signal, and color processing means combines the illumination color and intensity signal for each pixel area with the same signals from two adjacent pixel areas, to provide a pixel color signal representing a composite color for the pixel area. Means are provided for processing sequences of pixel color signals to eliminate transition colors.

25 Claims, 15 Drawing Figures

ILLUMINATION AT 160

ILLUMINATION AT 162

ILLUMINATION AT 164

| FIRST SCAN COLOR | SOURCE | WHITE | | GREEN | | | WHITE | | |
|---|---|---|---|---|---|---|---|---|---|
| RED | COLOR TABLE | – | – | W | Cy | Cy | G | Y | Y | W |
| RED | SEQ. INT. | – | – | W | W | W | G | G | G | W |
| GREEN | COLOR TABLE | – | – | W | W | Y | G | G | Cy | W |
| GREEN | SEQ. INT. | – | – | W | W | W | W | G | G | W |
| BLUE | COLOR TABLE | – | – | W | Y | G | G | Y | W | W |
| BLUE | SEQ. INT. | – | – | W | W | W | G | G | W | W |

*Fig. 12.*

| FIRST SCAN COLOR | SOURCE | WHITE | | BLACK | | | WHITE | | |
|---|---|---|---|---|---|---|---|---|---|
| RED | COLOR TABLE | – | – | W | Cy | B | BLK | R | Y | W |
| RED | SEQ. INT. | – | – | W | W | W | BLK | BLK | W | W |
| GREEN | COLOR TABLE | – | – | W | Mg | R | BLK | G | Cy | W |
| GREEN | SEQ. INT. | – | – | W | W | W | BLK | BLK | W | W |
| BLUE | COLOR TABLE | – | – | W | Y | G | BLK | B | Mg | W |
| BLUE | SEQ. INT. | – | – | W | W | W | BLK | BLK | W | W |

*Fig. 13.*

SCANNING APPARATUS AND METHOD

FIELD OF THE INVENTION

The present invention relates to apparatus and method for optically scanning sheets such as charts, including charts that may contain a plurality of line graphs of different colors.

BACKGROUND OF THE INVENTION

The measurement of the gas flow in a pipeline typically requires a series of meters located along the pipeline, each meter recording data that is sufficient to determine the volume of gas flowing through the meter. The two most commonly used techniques for measuring gas volume are orifice measurements and PVT measurements. Orifice measurement meters are typically found on large flow stations, and operate by recording pressure and the pressure drop across an orifice placed in the pipeline. These two quantities are plotted as a function of time on a circular chart. Gas temperature is also recorded, on the same chart or on a separate chart, and the gas temperature data is combined with measurements of the areas under the pressure and pressure drop curves to calculate flow volume. PVT measurement is different from the orifice measurement described above, in that a direct volume reading is recorded on the chart, along with the pressure and temperature. These three values are sufficient to calculate corrected volume figures.

The problem with PVT charts and orifice charts having temperature readings is that three readings must be made simultaneously to make accurate calculations. Thus, many companies drop temperature off of the orifice chart to simplify the calculation. The separate temperature chart is usually sight read or estimated.

Charts vary in length from 24 hours (high volume measurement stations) to up to 31 days in low volume stations. Seven day charts are the most common multi-day charts. Volume calculations are often broken down into daily volumes from these charts. Charts come in from the field from a variety of meter types, and in several time lengths. After being checked in and logged as to customer, meter number and chart date, the charts are sorted and either sight read, integrated by a special machine that calculates the total area under one or two plotted pen lines, or optically scanned. When integration is used, orifice charts that have both pressure and differential plots must have both curves continuously monitored through the entire chart interval to calculate volume. A machine that has two pens, controlled by hand levers, and a rotating table, controlled by a speed pedal, is used by a skilled operator to exactly reproduce the meter movements and subsequently calculate average pressure over the whole chart, and a quantity known as extension that is derived from pressure and differential pressure. Typically, 2,000 readings are taken on a full chart. Once this step is completed, the resulting values are printed on the back of the chart for entry into the volume calculation computer. Prior scanning devices have been used to measure the pressure and differential curves from orifice meters. However, in the past, temperature could not be recorded on such charts, since no scanners were capable of accepting charts having more than two curves.

In the past, optical scanning has invariably required a preparatory step in which an operator cleans up the chart to be acceptable input for the scanner. The clean-up of a chart to be scanned basically requires marking or erasing areas of the chart to produce acceptable scanner input. The clean up of charts for scanners can be a time consuming process, involving the use of a white-out material such as used for typewriters, white tape, or felt tip pens to accentuate dim scans or extend data where it was missing due to a slow clock. The individuals doing chart clean up also must have a high level of training.

With prior scanners, the chart color typically must be pale blue, a color difficult to sight read, and specially manufactured red and black inks are also required. In addition, when two curves cross on a given chart, conventional optical scanners have no means to track which curve is which after they diverge. A result of this limitation is that on a two-graph chart, pressure must either be the inner or outer curve, and charts must be sorted depending on the relative positions of the two curves. If two curves do cross, the pressure figure can typically not be determined. Recently, however, some scanners have become available that can distinguish up to two different colors from one another. However, temperature data can still not be taken with pressure data, and temperature data has therefore been sight averaged for systems employing such scanners.

SUMMARY OF THE INVENTION

The present invention provides a scanner that is capable of rapidly and accurately reading a sheet such as a chart, without the use of complex optical or mechanical scanning apparatus. In another aspect, the present invention provides a scanner and scanning method that are capable of efficient color separation at high resolution.

In one embodiment, the present invention provides a scanner for scanning a sheet such as a chart. The scanner includes scanning means and detection means. The scanning means includes support means for mounting the sheet, illumination means for directing light onto an illuminated area of the sheet, the illuminated area being elongated along a scan direction. The scanning means also includes means for causing the illuminated area to move across the sheet in a movement direction normal to the scan direction. The detection means comprises a photodetector array and a coherent fiber optic bundle. The array comprises a plurality of photodetector elements positioned side by side along a line. The coherent fiber optic bundle has essentially linear first and second apertures, and a plurality of fiber optic cables extending between the first and second apertures. The relative position of a given cable at one aperture is the same as the relative position of that cable at the other aperture. The coherent fiber optic bundle is tapered, such that the width of the first aperture is greater than the width of the second aperture. The first aperture is positioned adjacent and parallel to the illuminated area, such that light reflected by the sheet can enter the first aperture. The second aperture is positioned adjacent and parallel to the photodetector array, such that light exiting from the second aperture falls on the photodetector elements.

In a second aspect, the scanner of the present invention comprises scanning means and processing means. The scanning means includes support means for mounting the sheet, illumination means for directing light onto an illuminated area of the sheet, and means for causing the illuminated area to move in a first direction across the sheet such that the illumination means sequentially directs the light onto a series of pixel areas on the sheet.

The scanning means also includes means for varying the color of the light such that as the illuminated area moves across the sheet in the first direction, the color of the light alternates between first and second illumination colors, thereby alternately illuminating the pixel areas with light of the first and second illumination colors. The scanning means further includes means for producing an illumination color signal representing the illumination color for each pixel area. The processing means includes detection means for detecting reflected light from each pixel area and for producing an intensity signal representing an intensity value for the reflected light for each pixel area. The processing means also includes color processing means for combining the illumination color signal and intensity signal for each pixel area with the same signals from at least one adjacent pixel area, to provide a pixel color signal representing a composite color for the pixel area.

In a preferred embodiment, the illumination means is elongated in a second direction normal to the first direction, and is adapted to vary the color of the light between first, second and third illumination colors. The color processing means operates in response to each intensity signal to produce three color coordinate signals representing the received intensity signal and the intensity signals for two adjacent pixel areas, and color table means responsive to the color coordinate signals for producing the pixel color signal representing a composite color corresponding to the color that would be produced by combining light of the first, second and third colors in ratios corresponding to the color coordinate signals. The composite color corresponds to one of the illumination colors when one of the color coordinate signals represents an intensity value above a predetermined threshold and the other color coordinate signals represent intensity values below the threshold, and corresponds to a transition color when two of the color coordinate signals represent intensity values above the threshold and the other color coordinate signal represents an intensity value below the threshold. The scanner may further include sequence interpreter means for receiving the pixel color signals and converting pixel color signals representing transition colors to pixel color signals representing illumination colors.

BRIEF DESCRIPTION OF THE DRAWINGS

FIG. 10 is a diagram showing the data produced by a circumferential blue line;

FIG. 11 is a diagram showing the data produced by a radial blue line;

FIG. 12 is a diagram showing one example of the operation of the sequence interpreter; and FIG. 13 is a diagram showing a second example of the operation of the sequence interpreter.

DETAILED DESCRIPTION OF THE INVENTION

Figure 1:
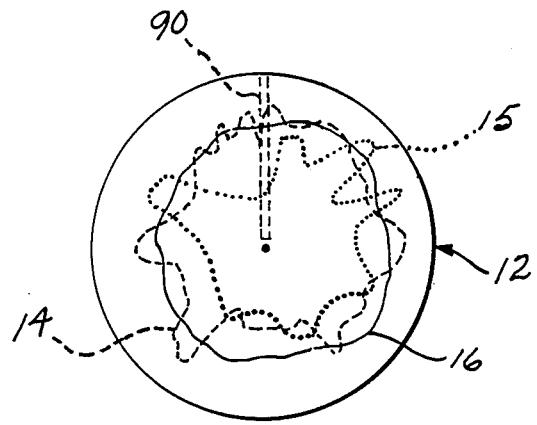
FIG. 1 is an example of a chart of the type that may be scanned by the scanner and scanning method of the present invention.
Figure 2:
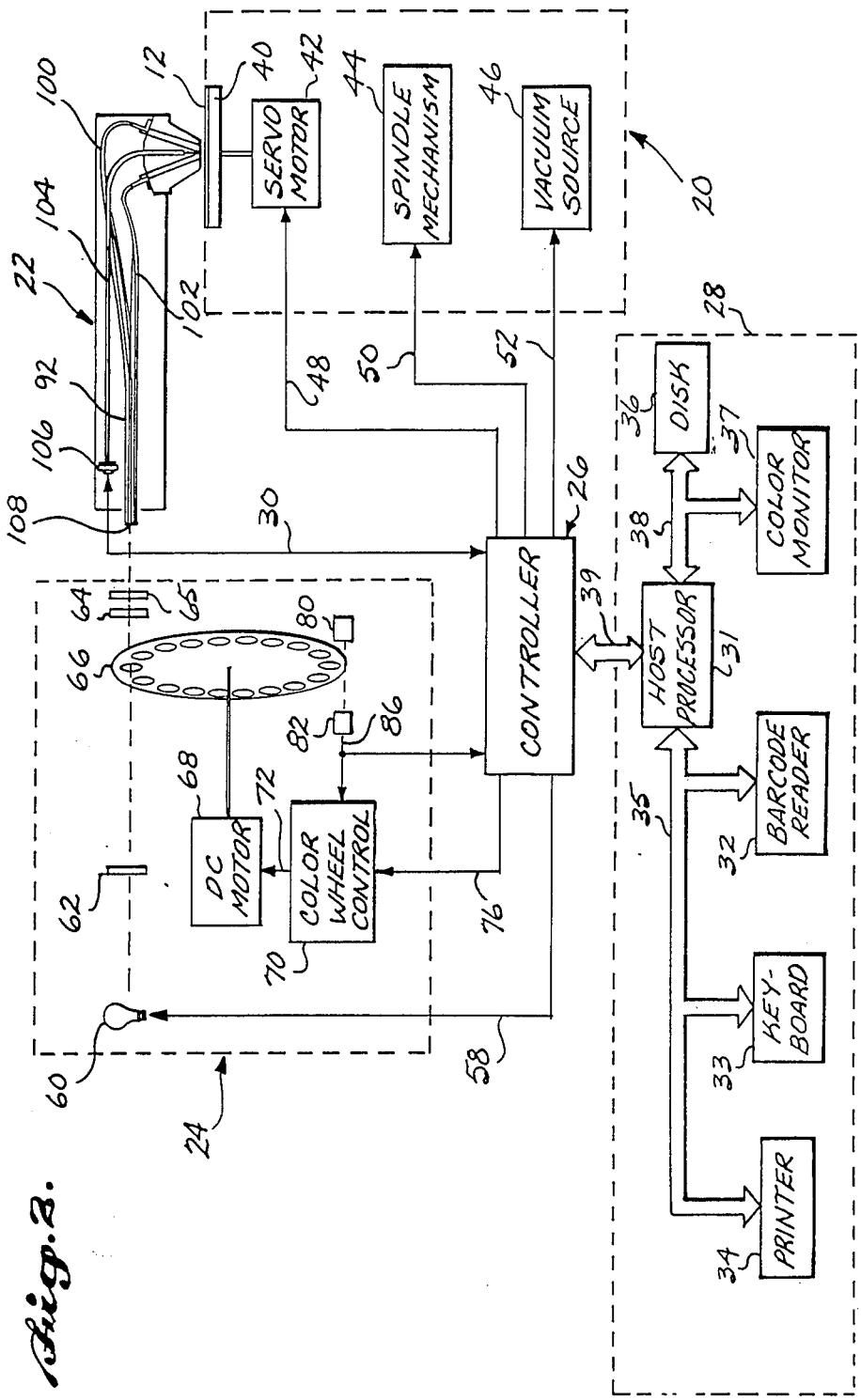
FIG. 2 is a block diagram of a preferred embodiment of the scanning apparatus of the present invention.
Figure 3:
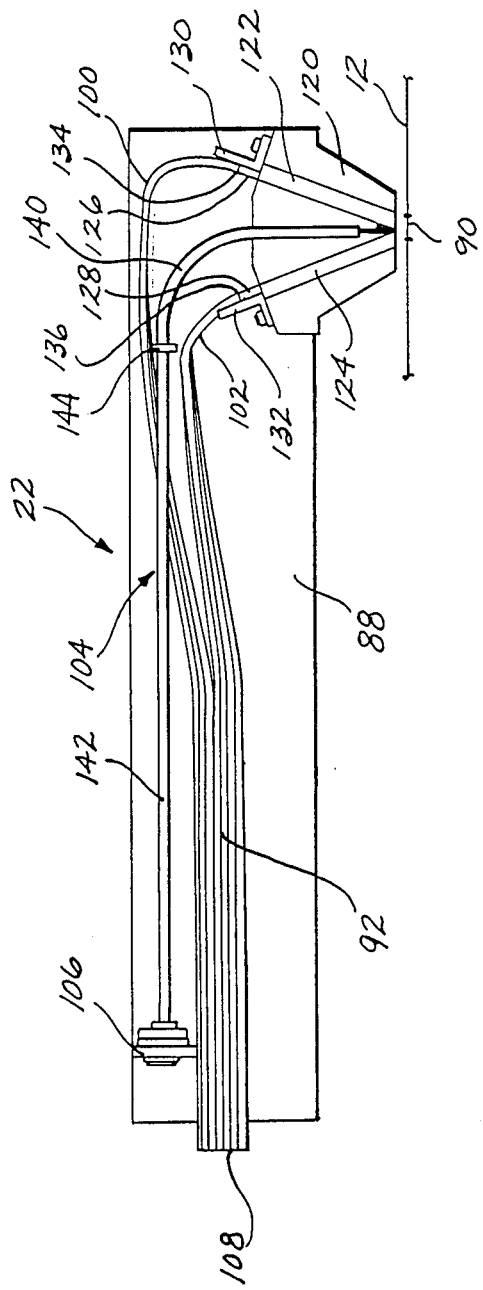
FIG. 3 is a partial cross-sectional view of the optical arm.

FIGS. 1-3 present an overall view of a preferred embodiment of the scanning apparatus of the present invention. The illustrated apparatus is capable of simultaneously reading a plurality of graphs marked on circular chart 12. In the example shown in FIG. 1, chart 12 includes three separate graphs 14-16. The scanning system of the present invention includes color discrimination means that enables it to track graphs 14-16 even if the graphs intersect one another, provided that they are drawn in different color inks. The system of the present invention therefore provides a higher level of utilization of each chart 12 as compared to prior chart scanners. For a gas pipeline application, graphs 14-16 might comprise pressure, pressure drop and temperature, or volume, pressure and temperature for PVT measurements. While the present invention is illustrated herein with reference to circular charts, it will be appreciated from the following description that the invention could likewise be applied to linear charts, or to sheets and charts in other shapes or configurations.

Referring now principally to FIG. 2, the illustrated chart scanner includes turntable system 20 for supporting and rotating chart 12, optical arm 22, illumination system 24, controller 26, and computer 28. Illumination system 24 provides illumination light that is conveyed to chart 12 by optical arm 22 while the chart is rotated by turntable system 20. Optical arm 22 detects light reflected from the chart, converts such light into an electrical video signal, and sends the video signal to controller 26 via signal path 30. The controller processes the video signal to produce information concerning the positions of lines of various colors on chart 12. The line position information is transferred to computer 28, where it is processed, displayed and/or stored, as more fully described below.

Turntable system 20 includes circular platter 40 for supporting chart 12, servomotor 42 for rotating platter 40 at a selected rate of rotation, conventional spindle mechanism 44 for centering chart 12 on platter 40, and vacuum source 46 for applying a small amount of negative air pressure to the surface of platter 40, in order to secure chart 12 to the surface. Servomotor 42, spindle mechanism 44 and vacuum source 46 operate in response to signals from controller 26 via lines 48, 50 and 52 respectively.

Illumination system 24 includes white light source 60 that is turned on and off by means of a signal from controller 26 via line 58. A suitable white light source is a 250-watt GE MultiMirror Precise bulb. Light from source 60 is directed through heat reflecting mirror 62 to color wheel 66. The color wheel includes eighteen circular apertures spaced around its periphery, the apertures containing alternating red, green and blue filters. In a preferred embodiment, the blue filters have passbands of approximately 400-500 nanometers, the green filters have passbands of 500-600 nanometers, and the red filters have passbands of 600-700 nanometers. Color wheel 66 is rotated by DC motor 68, and the speed of DC motor 68 is controlled by color wheel control 70 by means of a DC analog signal on line 72. Color wheel control 70 is in turn synchronized by a clock signal from the controller via line 76. Light passing through one of the filters of color wheel 66 passes through IR filter 64 and color compensation filter 65. IR filter 64 removes IR radiation that was not blocked by heat reflecting mirror 62, and color compensation filter 65 compensates for the nonuniform spectrum of source 60.

Illumination system 24 also includes encoder means for detecting the position of color wheel 66. The encoder means includes LED 80 and photodetector 82 positioned on opposite sides of the color wheel. Color wheel 66 includes a number of small apertures (not shown), positioned such that at certain rotational positions of the color wheel, one of such apertures permits light from LED 80 to reach photodetector 82, whereupon the photodetector produces a position signal on line 86 that is sent to controller 26 and also to color wheel control 70. The operation of these components is described in greater detail below.

Computer 28 includes host processor 31, bar code reader 32, keyboard 33 and printer 34 that interface with the host processor via bus 35, and disk 36 and color monitor 37 that interface with the host processor via bus 38. The controller and host processor directly interface with one another via bus 39. Computer 28 functions to process the chart data provided by controller 26. For example, for processing charts from gas pipeline meters, computer 28 could be set up such that an operator could input identifying information concerning each chart via bar code reader 32 and/or keyboard 33. Graph position information thereafter determined by controller 26 could be displayed on color monitor 37 by the host processor, giving an operator an opportunity to electronically edit the data as appropriate via keyboard 33. The host processor could then save the data to disk 36, and output a summary of the data, such as total gas volume, meter number and date, via printer 34. Numerous other arrangements are of course possible, depending upon the ultimate application of the chart scanning system.

Optical arm 22, best shown in FIG. 3, receives light that has passed through color wheel 66, and conveys such light to a linear, radial area 90 of chart 12 (see FIG. 1). The optical arm also detects light reflected from area 90, and converts such light into a video signal that is transmitted to controller 26 via line 30. Optical arm 22 comprises frame 88, optical conduit 92, flexible fiber optic bundles 100 and 102, rigid fiber optic conduit 104, and ccd array 106. Light passing through color wheel 66 enters light conduit 92 via rectangular aperture 108. Conduit 92 comprises a multitude of parallel fiber optic cables that separate in a predetermined manner into bundles 100 and 102.

End piece 120 is mounted to the underside of frame 88 at the outer end thereof immediately above chart 12. End piece 120 includes rigid light guides 122 and 124 symmetrically positioned on opposite sides of the end piece. End piece 120 also includes a vertical, central opening to accommodate the downturned end of rigid fiber optic conduit 104. Mixer plates 126 and 128 are mounted to the upper surface of end piece 120 by angle brackets 130 and 132, respectively. Fiber optic bundle 100 terminates in an essentially linear aperture 134 that extends into and out of the plane of the drawing in FIG. 3 for a distance equal to the length of area 90 shown in FIG. 1. Light exiting from bundle 100 via aperture 134 passes into and through mixer plate 126 into light guide 122, and is conveyed by the light guide onto area 90 of chart 12. Plate 126 and light guide 122 extend into and out of the plane of the drawing in FIG. 3 to the same extent as aperture 134. In a similar manner, fiber optic bundle 102 terminates in linear aperture 136, and light exiting from bundle 102 via aperture 136 passes through mixer plate 128 and light guide 124 onto area 90 of chart 12. The mixer plates provide a limited amount of mixing of the light from adjacent fibers, to produce an averaging effect that reduces intensity variations in the radial direction along area 90. Light reflected from area 90 is picked up by the fiber optic cables of rigid fiber optic conduit 104, and conveyed by conduit 104 to CCD array 106. At the end of conduit 104 adjacent chart 12, the cladding of the cables in the conduit is removed, so as to permit light guides 122 and 124 to be spaced closer together.

Figure 4:
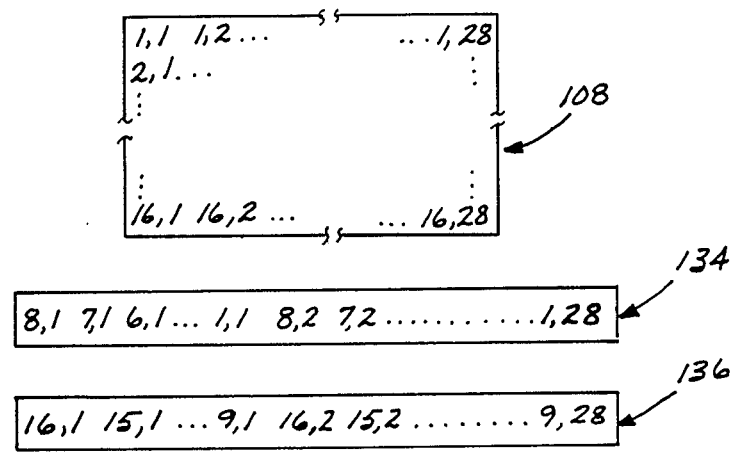
FIG. 4 is a diagram showing the mapping of fiber optic cables in the illumination system.

The overall mapping of fiber optic cables from rectangular aperture 108 to linear apertures 134 and 136 is illustrated in FIG. 4. In FIG. 4, the fiber optic cables at aperture 108 have been indexed using a two-dimensional coordinate system in which the first coordinate gives the row number and the second coordinate gives the column number, there being a total of 16 rows and 28 columns. FIG. 4 illustrates that the fiber optic cables of linear aperture 134 are derived from the fiber optic cables in the top eight rows of rectangular aperture 108, while the fiber optic cables of linear aperture 136 are derived from the fiber optic cables in the lower eight rows of aperture 108. Furthermore, for each linear aperture, the rows have been collapsed one upon the other, such that all cables that begin in a single column at aperture 108 form a mutually adjacent group at linear apertures 134 and 136. Since linear apertures 134 and 136 are adjacent to one another above chart 12, the effect is that rectangular aperture 108 is collapsed in a vertical direction, as viewed in FIG. 4, to illuminate the chart.

Figure 5:
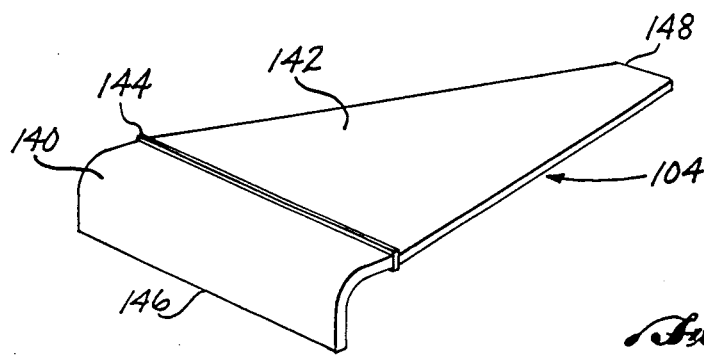
FIG. 5 is a perspective view of the fiber optic detection conduit.

Rigid fiber optic conduit 104 is illustrated in greater detail in FIG. 5. Conduit 104 comprises angled section 140 and tapered section 142 joined by connector 144. Both angled section 140 and tapered section 142 comprise a plurality of side-by-side fiber optic cables that form linear pick-up aperture 146 at the downturned end of angled section 140 adjacent area 90 of chart 12, and linear output aperture 148 adjacent CCD array 106. The length of aperture 140 is equal to the length of area 90. Conduit 104 undergoes a 90 degree bend at the end adjacent aperture 146. Furthermore, in accordance with the present invention, section 142 is tapered, such that aperture 148 is smaller than aperture 146. In the illustrated preferred embodiment, aperture 148 is approximately one fifth the length of aperture 146.

Angled section 140 and tapered section 142 may both be fabricated using known techniques from coherent bundles of optical fibers that have been formed into plates or ribbonS. For angled section 140, a plate of the appropriate width and thickness is selected, and the plate is then heated and bent to produce the required 90° bend. For tapered section 142, the coherent bundle plate is heated and stretched lengthwise in a controlled manner that is similar to the technique for producing individual fiber optic cables. The stretching results in an elongated plate that includes a center section of reduced width and thickness, the width and thickness dimensions increasing in an approximately linear fashion as one moves away from the center section towards either end. These tapering portions are then broken at the appropriate places to produce tapered section 104 having appropriate dimensions and an appropriate rate of tapering. Coherent bundles optimized for a given application may be obtained to order from a number of vendors.

As a result of the described construction, conduit 104 preserves the relative positions of the individual cables, such that two cables that are adjacent to one another at pick-up aperture 146 are similarly positioned at aperture 148. The effect of the tapering of conduit 104 is that a comparatively large chart area 90 can be directly mapped onto a smaller detector, such as CCD array 106, without a complex optical system and without parallax or other errors due to the misalignment of components. For a typical chart reading operation, suitable fiber optic cables for use in conduit 104 are 20 micron cables bundled to make 5 mil fibers. Suitable dimensions for aperture 146 are a width of five inches and a thickness of 5 mils, and suitable dimensions for aperture 148 are a width of 1 inch and a thickness of 1 mil.

Figure 6:
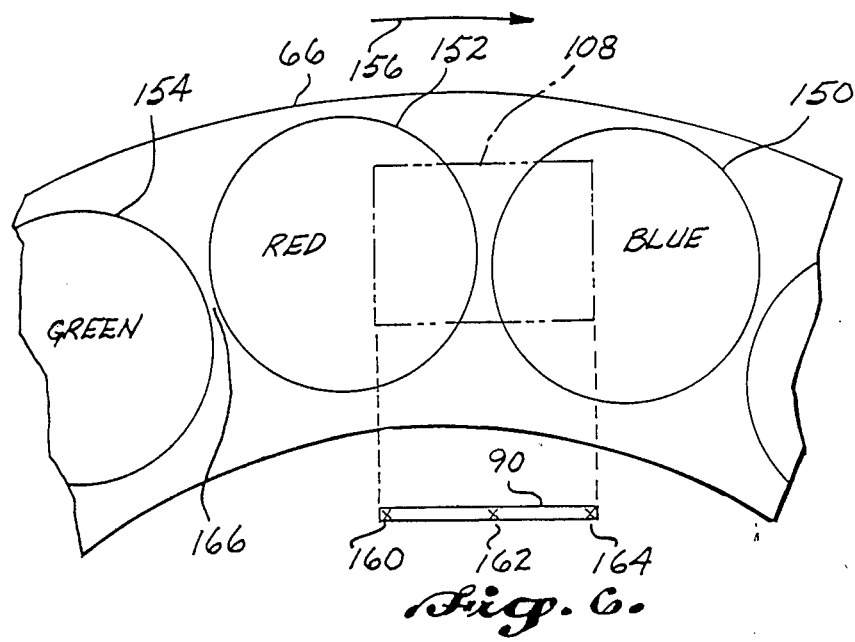
FIG. 6 is a partial schematic view of the color wheel.

The technique of illuminating chart 12 with light of different colors is illustrated in FIGS. 6 and 7. FIG. 6 illustrates a portion of color wheel 66 including blue filter 150, red filter 152 and green filter 154. FIG. 6 also illustrates aperture 108 that is positioned adjacent to color wheel 66. The motion of color wheel 66 with respect to aperture 108 is indicated by arrow 156. As previously described with respect to FIG. 4, optical arm 22 maps the individual cables of aperture 108 into a pair of linear apertures 134 and 136, and the light from apertures 134 and 136 combines to illuminate area 90 of chart 12. FIG. 6 illustrates the overall mapping of aperture 108 onto linear area 90 of chart 12, the mapping comprising a collapsing of rectangular aperture 108 along the circumferential direction of color wheel 66.

Figure 7A:
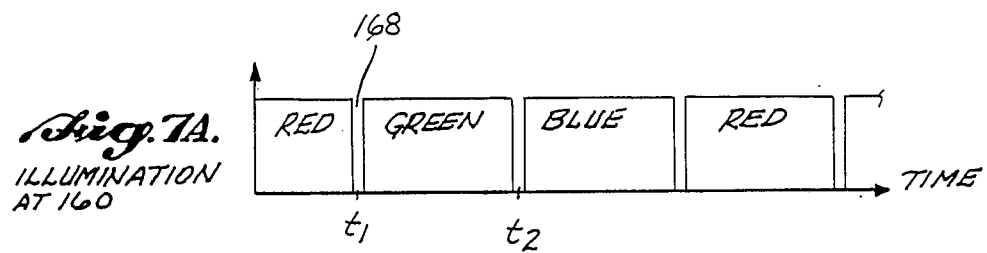
FIGS. 7A-7C comprise graphs showing the illumination as a function of time at three different points.
Figure 7B:
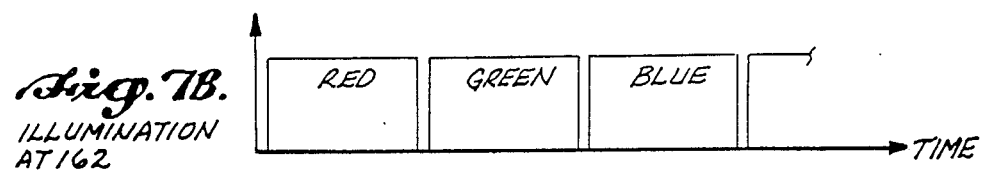
Figure 7C:
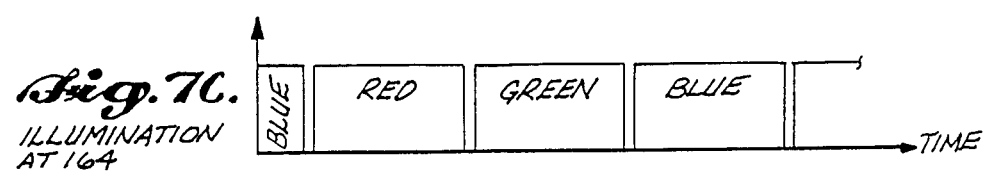

The effect of the motion of color wheel 66 on the illumination received by the chart is illustrated by FIGS. 7A-7C, wherein it is assumed that the color wheel position of FIG. 6 corresponds to time zero. FIG. 7A shows the illumination as a function of time at point 160 at one end of area 90. As illustrated, at subsequent time $t_1$, point 160 will be positioned in alignment with area 166 between red filter 152 and green filter 154, and therefore no illumination will fall on point 160 at time $t_1$. Point 160 will then be illuminated with green light until time $t_2$ and the process will continue as illustrated in FIG. 7A, with periods of essentially constant illumination with light of a given color separated by much shorter dark bands 168 in which no illumination falls on the particular point of area 90.

FIG. 7B illustrates the illumination at point 162 that is positioned near the center of area 90. Similarly, FIG. 7C illustrates the illumination at point 164 at the opposite end of area 90 from point 160. The illumination that occurs at points 162 and 164 are identical to the illumination at point 160, except that they are shifted along the time axis.

Figure 8:
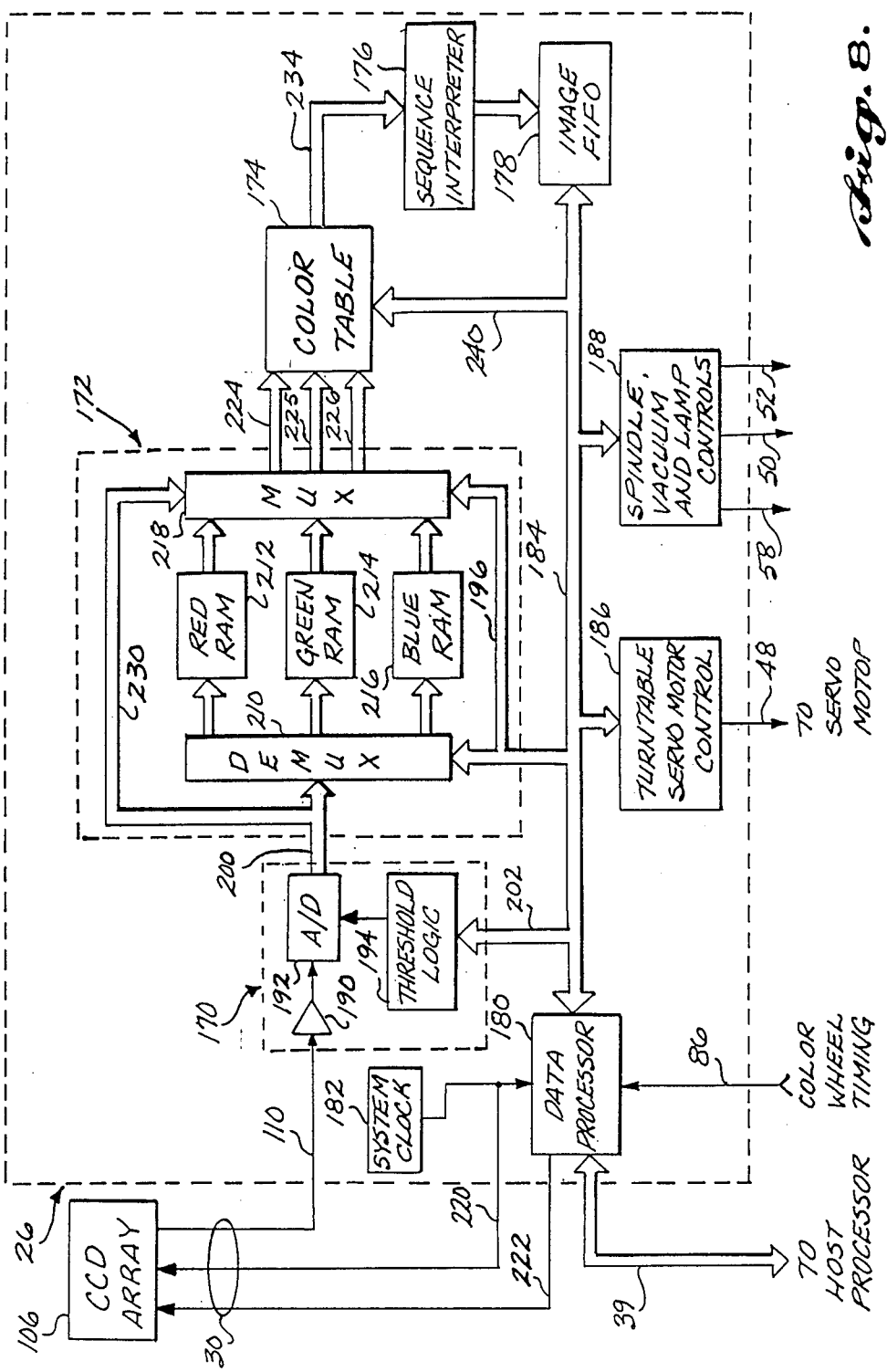
FIG. 8 is a block diagram of the controller.

FIG. 8 provides additional details concerning controller 26. The controller comprises front end 170, barrel processor 172, color table 174, sequence interpreter 176, image FIFO 178, and data processor 180. The controller also includes system clock 182, system bus 184, turntable servomotor control 186, and spindle, vacuum and lamp controls 188. CCD array 106 provides a video signal on line 110 that is received by front end 170 of controller 26. The video signal is digitized by front end 170, and the resulting digital signals are then processed through barrel processor 172, color table 174 and sequence interpreter 176, to produce data in image FIFO 178 representing the positions of lines on chart 12. The data in image FIFO 178 is retrieved and further processed by data processor 180, and then transferred to computer 28 via bus 39.

Data processor 180 operates turntable servomotor control 186 to produce an appropriate signal on line 48 for controlling the speed of the turntable servomotor, and thus the rotation rate of chart 12. Data processor 180 also provides appropriate data and control signals to spindle, vacuum and lamp controls 188, so as to cause control circuit 188 to issue appropriate signals on lines 58, 50 and 52, respectively (see FIG. 2). The signal on line 58 controls light source 60, and is used to turn on the light source at the beginning of a chart reading operation, and to subsequently turn the light source off a predetermined time after a reading operation is complete. The chart reading operation typically comprises one complete revolution of chart 12. Signals on lines 50 and 52 control the spindle mechanism 44 and vacuum source 46 of turntable systems, to coordinate the operation of these components.

CCD array 106 is a conventional unit that preferably comprises a linear array of 2048 individual light sensitive elements. Each element is an integrating device, i.e., the voltage provided by each element is a product or integral of the time since the elements was reset multiplied by the light intensity during such time. The light sensitive elements are read out, one at a time, at a rate determined by the clock signal on line 220. The charge stored by each element is reset to zero at the time it is read out. Fiber optic conduit 104 maps radial area 90 of chart 12 onto the 2048 elements. The sequential readout of all 2048 elements will therefore be termed one "radial scan." Each radial scan commences in response to a reset signal from data processor 180 on line 222. The frequency of the clock signal and the color wheel rotation rate are adjusted such that the time required for a radial scan is approximately equal to the time required for one of the filters of color wheel 66 to move past aperture 108 (see FIG. 6). Referring to FIG. 7A, this time is equal to $t_2-t_1$. Assuming that a radial scan commences at the light sensitive element corresponding to point 160 in FIG. 6, the data processor would provide the reset signal at time $t_1$ when dark band 168 was at point 160. As a result of this arrangement, each light sensitive element of CCD array 106 is sampled at the time that a dark band passes over such element, and the signal produced by the element therefore represents illumination by light of a single color for a time period $t_2-t_1$.

Front end 170 functions to convert the video signal on line 110 into a series of digital signals on bus 200 for input to barrel processor 172. The front end comprises amplifier 190, A/D 192, and threshold logic 194. The threshold logic receives scaling Xata from data processor 180 via bus 202, and uses such scaling data to control A/D 192 to provide suitable resolution in the conversion process. For each radial scan, the output of front end 170 comprises a series of 2048 digital signals representing 2048 radial positions along area 90 under a given illumination color. Each radial "line" of data for a given color is displaced slightly from the preceding line, due to the rotation of chart 12 from one radial scan to the next.

The stream of digital data on bus 200 is input to barrel processor 172. The barrel processor comprises demultiplexer 210, red RAM 212, green RAM 214, blue RAM 216, and multiplexer 218. Each of RAMS 212, 214 and 216 can store one line or radial scan of data. At any given moment, the signal on bus 200 represents the light intensity under illumination of a given color, and at a given radial position along area 90. The function of barrel processor 172 is to provide output signals on buses 224, 225 and 226 that represent the current light intensity signal on but 200 (representing a given color and a given radial position), and the corresponding intensity values during the two previous radial scans at the same radial position. Because the illumination color changes with each radial scan, the three signals provided on buses 224, 226 and 228 therefore represent the illumination received at three positions that have the same radial coordinate and closely spaced circumferential coordinates, under three different illumination colors. Barrel processor 172 performs this operation by providing the current signal on bus 200 directly to multiplexer 218 via bus 230, and by directing the series of digital values for each radial scan into the appropriate RAM, depending on the color under which such data was obtained. Information concerning the color of each radial scan is provided by data processor 180 via bus 196. The data processor derives such information from the position signal provided by photodetector 82 (see FIG. 2) on line 86. Multiplexer 218 utilizes the signal on bus 230 to create one of the output signals on buses 224-226, and selects the other two signals from the appropriate RAMS, such that all three colors are represented in the barrel processor outputs.

Figure 9:
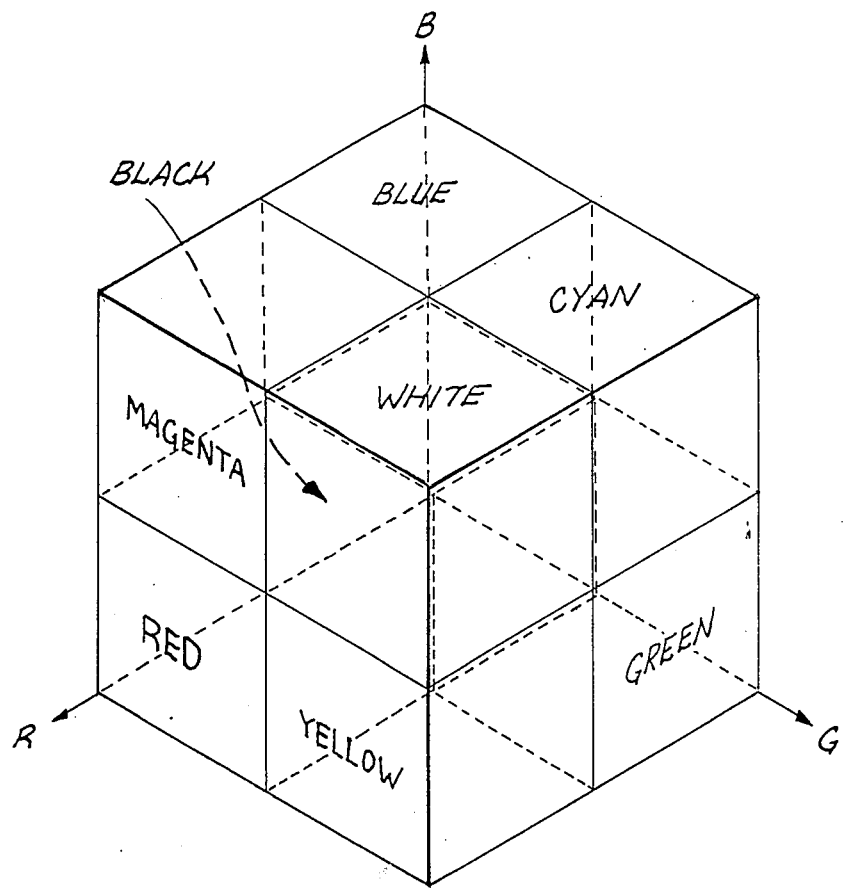
FIG. 9 is a perspective view of the color space of one preferred embodiment of the present invention.

Color table 174 determines the color represented by the three intensity values on buses 224-226, using the concept of a color space, such as the color space illustrated in FIG. 9. Each possible combination of three red, green and blue intensity values is assigned a particular color. In the example shown in FIG. 9, the colors are red, green, blue, white, black, magenta, cyan and yellow. Points associated with a given color occupy a contiguous volume in the three-dimensional color space. The exact sizes and shapes of each of such regions may be adjusted to suit a particular application. Color table 174 performs a color determination simply by using the three signals on buses 224-226 as an address in a RAM wherein codes representing the different colors are stored. The color table RAM may be loaded by data processor 180 via bus 240 upon system initialization. As a result of the operation performed by color look-up table 174, the color table provides a signal on bus 234, for each radial position for each scan, that represents the assigned color corresponding to the set of intensity values on buses 224-226.

Figures 10, 11:
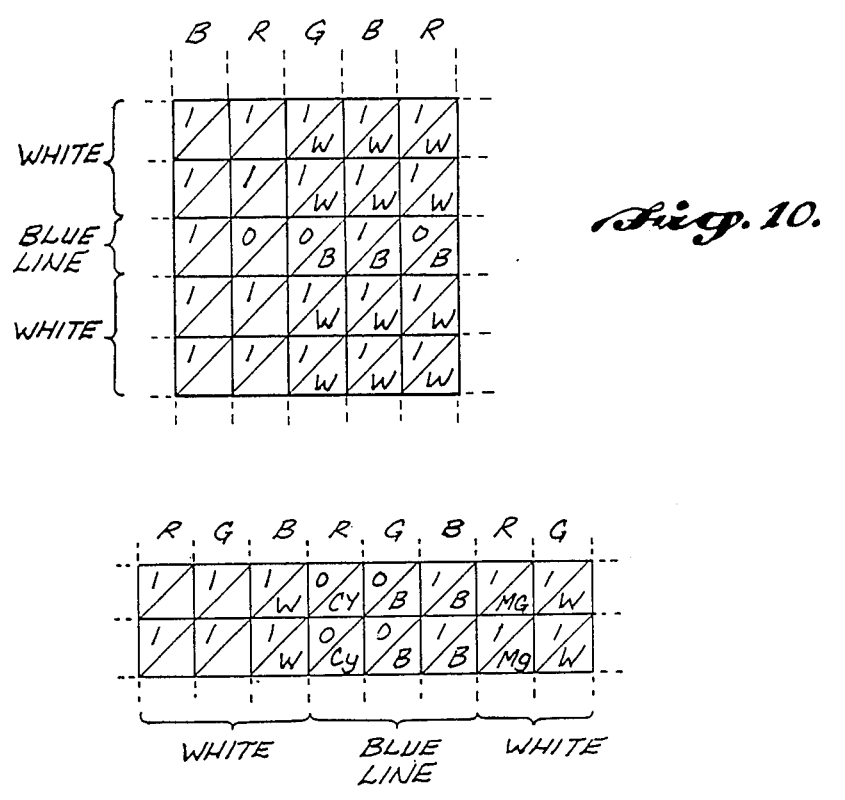

FIGS. 10 and 11 provide two examples of the color table. In FIG. 10, each column represents a portion of one radial scan, and the letter at the top of the column indicates the illumination color during that scan, i.e., B for blue, R for red, and G for green. Each rectangle in each column represents one pixel, i.e., the area of chart 12 corresponding to one element of CCD array 106 for one scan. The value (zero or one) in the upper left of each pixel represents the signal received by front end 170 for that pixel. In this simplified example, a value of one indicates that the signal was above a predetermined threshold, while a value of zero indicates that the signal was below such threshold. In an actual example, each pixel could take on a greater range of values, the number of values corresponding to the desired resolution for the color look-up process.

In the example of FIG. 10, the scanned area of the chart includes a circumferential blue line (row 3) having a width of one pixel against a white background. As illustrated, during radial scans under blue light, all pixels are assigned a value of one. However, for radial scans under red or green light, the pixel in the row corresponding to the blue line are assigned values of zero. For each pixel, the color table assigns a color based upon the value of that pixel and the value of the two prior pixels at the same radial position. The resulting color values are shown in the lower right of each pixel for the third, fourth and fifth columns. All pixels corresponding to the white background are assigned the color white (W), because the intensity values are high for all three colors (see FIG. 9). However, all pixels in the third row are assigned the cXlor blue (B), since the inputs to the color look-up table for these pixels comprise a high signal for blue and low signals for red and green. This figure thus illustrates that the chart scanner of the present invention is capable of detecting a circumferential line having a width corresponding to one element of CCD array 106.

FIG. 11 is similar to FIG. 10, but represents the results of scanning a radial blue line having a width corresponding to three radial scans. The chart colors are indicated along the bottom portion of FIG. 11, and represent a blue line having a width of three scans surrounded by a white background. Only two radial positions are shown in FIG. 11, since in this example all radial positions produce the same result. As illustrated in FIG. 11, the scan through a radial blue line produces the following sequence of colors at each radial position: white (W), cyan (Cy), blue (B), blue (B), magenta (Mg), white (W). It can readily be appreciated from FIG. 11 that a different sequence would be obtained if the blue radial scan occurred during the middle of the blue line or at the left-hand edge of the blue line. Yet further sequences would be obtained if the blue line had a width less than or greater than three radial scans.

FIG. 11 illustrates that because the chart moves between successive radial scans, color lookup table 174 produces outputs representing transition colors (cyan and magenta) in response to a blue line that extends in a radial direction. A change in the phase relationship between the scan color and position of the blue line would produce a third transition color, yellow. Referring again to FIG. 8, the function of sequence interpreter 176 is to eliminate the transition colors before the data is processed by data processor 180. Sequence interpreter 176 receives the color signals from color table 174 via bus 234. The sequence interpreter eliminates transition colors by examining the color at each radial position of a scan and the two colors produced at the same radial position during the two immediately preceeding scans. An example of the sequence interpreter processing is set forth in FIG. 12. The first row of color values in FIG. 12 represents the output of color table 174 for a radial green line having a width of 3 pixels, for the case in which the first radial scan within the green line occurs when the illumination color is red. This latter condition is indicated by the entry "RED" under the heading "First Scan Color." The third row of FIG. 12 represents the output of color table 174 when the first scan color is green, and the fifth row of FIG. 12 represents the color table output when the first scan color is blue. Thus each of rows 1, 3 and 5 of FIG. 12 generally corresponds to one row of FIG. 11.

Sequence interpreter 176 may comprise three RAMs, similar to RAMs 212, 214 and 216 of barrel processor 172. Each sequence interpreter RAM stores data corresponding to one radial scan. As each new color value is received from color table 174 over bus 234 and stored in the appropriate "active" RAM, the sequence interpreter compares that color with the two colors produced at the same radial position during the immediately two preceeding scans, such scans being stored in the two currently inactive RAMs. When certain prescribed sequences that include transition colors are detected, the data representing a transition color is rewritten with data representing one of the three illumination colors (red, green, blue), or with data representing white or black. This process is illustrated in rows 2, 4 and 6 of FIG. 12. The second row of FIG. 12 represents the output produced by sequence interpreter 176 in response to the inputs from the color table set forth in the first of FIG. 12. The two cyan values preceding the green value are both converted to white, whereas the two yellow values following the green value are both converted to green. Rows 3–4 and 5–6 provide similar examples for the other two first scan colors.

The operation of the sequence interpreter is very similar to that of barrel processor 172 and color table 174. In particular, each color signal provided on bus 234 forms one of the inputs to a color transition table that is preferably stored in a PROM within sequence interpreter 176. The other two address inputs to the PROM comprise the color signals obtained at the same radial position for the two previous radial scans. The output of the PROM represents the corrected color, i.e., if the signal on line bus 234 represents a transition color, then the PROM output will represent one of the illumination colors or white or black. It can readily be verified simply by listing of the various possible combinations that such a technique will accurately identify and correct all transition colors for all lines having widths of three or more pixels.

FIG. 13 provides an example of the sequence interpreter operation for a radial black line having a width of 3 pixels. The examples of FIG. 13 serve to clarify some of the sequences shown in FIG. 12. For example, referring to rows 5 and 6 of FIG. 12, it may initially appear that the sequence WYG should be converted to WWG or to WGG, rather than to WWW as indicated in row 6 of FIG. 12. However, row 5 of FIG. 13 illustrates that the sequence WYG may also be present at the beginning of a scan through a black line. The sequence interpreter, therefore produces the output sequence WWW.

Colors output by sequence interpreter 176 are placed into image FIFO 178, for use by data processor 180. To speed up processing, the sequence interpreter may include an output stage that compares any color to the previous color along the same radial scan, and produces an output only when the color changes, or when a new radial scan begins. The processing of the color data by data processer 180 will vary greatly depending upon the particular application. Typically, the data will be sorted by color after the scan of a chart is complete, to thereby separate the data corresponding to graphs drawn with different colored inks. Each graph may then be combined with appropriate scaling constants to provide the actual data represented by the graphs. In an application for measuring the gas flow in a pipeline, the data would ultimately be converted to a corrected gas volume figure for the time period represented by the chart.

While a preferred embodiment of the invention has been illustrated and described, it should be understood that variations will be apparent to those skilled in the art. Accordingly, the invention is not to be limited to the specific embodiment illustrated and described, and the true scope and spirit of the invention are to be determined by reference to the following claims.

The embodiments of the invention in which an exclusive property or privilege is claimed are defined as follows:

1. A scanner for scanning a sheet such as a chart, the scanner comprising:

scanning means including support means for mounting the sheet, illumination means for directing light onto an illuminated area of the sheet, the illuminated area being elongated along a scan direction, means for causing the illuminated area to move in a movement direction across the sheet, the movement direction being normal to the scan direction; and, detection means comprising a photodetector array and a coherent fiber optic bundle, the array comprising a plurality of photodetector elements positioned side by side along a line, the coherent fiber optic bundle having essentially linear first and second apertures and a plurality of fiber optic cables extending between the first and second apertures such that the relative position of a given cable at one aperture is the same as the relative position of the given cable at the other aperture, the coherent fiber optic bundle being tapered such that the width of the first aperture is greater than the width of the second aperture, the first aperture being positioned adjacent and parallel to the illuminated area such that light reflected by the sheet can enter the first aperture, the second aperture being positioned adjacent and parallel to the photodetector array such that light exiting from the second aperture falls on the photodetector elements.

2. A scanner for scanning a sheet such as a chart, the scanner comprising:

scanning means including support means for mounting the sheet, illumination means for directing light onto an illuminated area of the sheet, means for causing the illuminated area to move in a first direction across the sheet such that the illumination means sequentially directs the light onto a series of pixel areas on the sheet, means for varying the color of the light such that as the illuminated area moves across the sheet in the first direction, the color of the light alternates between first and second illumination colors, to thereby alternately illuminate the pixel areas with light of the first and second illumination colors, and means for producing an illumination color signal representing the illumination color for each pixel area; and processing means including detection means for detecting reflected light from each pixel area and for producing an intensity signal representing an intensity value for said reflected light for each pixel area, and color processing means for combining the illumination color signal and intensity signal for each pixel area with the illumination color signal and intensity signal for at least one adjacent pixel area to provide a pixel color signal representing a composite color for the pixel area.

3. The scanner of claim 2, wherein the color processing means comprises means for receiving and storing the intensity signals, means operative in response to each received intensity signal for producing two color coordinate signals representing the received intensity signal and the stored intensity signal for an adjacent pixel area, and color table means responsive to the color coordinate signals for producing the pixel color signal such that the pixel color signal represents a composite color corresponding to the color that would be produced by combining light of the first and second illumination colors in ratios corresponding to the color coordinate signals.

4. The scanner of claim 3, wherein the pixel color signal represents one of the illumination colors when the color coordinate signal corresponding to said one illumination color represents an intensity value above a predetermined threshold, and the color coordinate signal corresponding to the other illumination color represents an intensity value below said threshold, wherein the pixel color signal represents white when both color coordinate signals represent intensity values above said threshold, and wherein the pixel color signal represents black when both color coordinate signals represent intensity values below said threshold.

5. The scanner of claim 2, wherein the illumination means is elongated in a second direction normal to the first direction, such that the illumination means directs light onto a plurality of series of pixel areas, each series having a unique coordinate along the second direction, and wherein the color processing means is adapted to combine the illumination color signal and intensity signal for each pixel area with the illumination color signal and intensity signal for at least one adjacent pixel area having the same coordinate along the second direction to provide the pixel color signal.

6. The scanner of claim 5, wherein the color processing means comprises means for receiving and storing the intensity signals, means operative in response to each received intensity signal for producing two color coordinate signals representing the received intensity signal and the stored intensity signal for an adjacent pixel area, and color table means responsive to the color coordinate signals for producing the pixel color signal such that the pixel color signal represents a composite color corresponding to the color that would be produced by combining light of the first and second illumination colors in ratios corresponding to the color coordinate signals.

7. The scanner of claim 6, wherein the pixel color signal represents one of the illumination colors when the color coordinate signal corresponding to said one illumination color represents an intensity value above a predetermined threshold, and the color coordinate signal corresponding to the other illumination color represents an intensity value below said threshold, wherein the pixel color signal represents white when both color coordinate signals represent intensity values above said threshold, and wherein the pixel color signal represents black when both color coordinate signals represent intensity values below said threshold.

8. The scanner of claim 2, wherein the color of the light alternates between first, second and third illumination colors such that pixel areas are alternately illuminated with light of the first, second, and third illumination colors, and wherein the color processing means is operative to combine the illumination color signal and intensity signal for each pixel area with the illumination color signal and intensity signal for at least two adjacent pixel areas to provide the pixel color signal for the pixel area.

9. The scanner of claim 8, wherein the color processing means comprises means for receiving and storing the intensity signals, means operative in response to each received intensity signal for producing three color coordinate signals representing the received intensity signal and the stored intensity signals for two adjacent pixel areas, and color table means responsive to the color coordinate signals for producing the pixel color signal such that the pixel color signal represents a composite color corresponding to the color that would be produced by combining light of the first, second and third illumination colors in ratios corresponding to the color coordinate signals.

10. The scanner of claim 9, wherein the pixel color signal represents one of the illumination colors when the color coordinate signal corresponding to said one illumination color represents an intensity value above a predetermined threshold and the color coordinate signals corresponding to the two other illumination colors represent intensity values below said threshold, wherein the pixel color signal represents white when all three color coordinate signals represent intensity values above said threshold, and wherein the pixel color signal represents black when all three color coordinate signals represent intensity values below said threshold.

11. The scanner of claim 10, wherein the pixel color signal represents a transition color when two of the color coordinate signals represent intensity values above said threshold and the other color coordinate signal represents an intensity value below said threshold, the transition color corresponding to the color that would be produced by combining light of the two illumination colors represented by the two color coordinate signals having intensity values above said threshold.

12. The scanner of claim 11, wherein the color processing means further comprises sequence interpreter means adapted to receive the pixel color signals representing the composite colors of adjacent pixel areas, and to convert pixel color signals representing one of the transition colors to pixel color signals representing white, black or one of the illumination colors.

13. The scanner of claim 8, wherein the illumination means is elongated in a second direction normal to the first direction, such that the illumination means directs light onto a plurality of series of pixel areas, each series having a unique coordinate along the second direction, and wherein the color processing means is adapted to combine the illumination color signal and intensity signal for each pixel area with the illumination color signal and intensity signal for at least one adjacent pixel area having the same coordinate along the second direction to provide the pixel color signal.

14. The scanner of claim 13, wherein the color processing means comprises means for receiving and storing the intensity signals, means operative in response to each received intensity signal for producing three color coordinate signals representing the received intensity signal and the stored intensity signals for two adjacent pixel areas, and color table means responsive to the color coordinate signals for producing the pixel color signal such that the pixel color signal represents a composite color corresponding to the color that would be produced by combining light of the first, second and third illumination colors in ratios corresponding to the color coordinate signals.

15. The scanner of claim 14, wherein the pixel color signal represents one of the illumination colors when the color coordinate signal corresponding to said one illumination color represents an intensity value above a predetermined threshold and the color coordinate signals corresponding to the two other illumination colors represent intensity values below said threshold, wherein the pixel color signal represents white when all three color coordinate signals represent intensity values above said threshold, and wherein the pixel color signal represents black when all three color coordinate signals represent intensity values below said threshold.

16. The scanner of claim 15, wherein the pixel color signal represents a transition color when two of the color coordinate signals represent intensity values above said threshold and the other color coordinate signal represents an intensity value below said threshold, the transition color corresponding to the color that would be produced by combining light of the two illumination colors represented by the two color coordinate signals having intensity values above said threshold.

17. The scanner of claim 16, wherein the color processing means further comprises sequence interpreter means adapted to receive the pixel color signals representing the composite colors of adjacent pixel areas, and to convert pixel color signals representing one of the transition colors to pixel color signals representing white, black or one of the illumination colors.

18. A scanning method for scanning a sheet such as a chart, the scanning method comprising:
  mounting the sheet;
  directing light onto an illuminated area of the sheet;
  causing the illuminated area to move in a first direction across the sheet such that the light is directed onto a series of pixel areas on the sheet;
  varying the color of the light such that as the illuminated area moves across the sheet in the first direction, the color of the light alternates between first and second illumination colors, to thereby alternately illuminate the pixel areas with light of the first and second illumination colors;
  producing an illumination color signal representing the illumination color for each pixel area;
  detecting reflected light from each pixel area and producing an intensity signal representing an intensity value for said reflected light for each pixel area; and
  combining the illumination color signal and intensity signal for each pixel area with the illumination color signal and intensity signal for at least one adjacent pixel area to provide a pixel color signal representing a composite color for the pixel area.

19. The method of claim 18, further comprising producing two color coordinate signals in response to the production of the intensity signal for each pixel area, the two color coordinate signals representing the intensity signal for the pixel area and the intensity signal for an adjacent pixel area, and wherein the pixel color signal represents a composite color corresponding to the color that would be produced by combining light of the first and second illumination colors in ratios corresponding to the color coordinate signals.

20. The method of claim 19, wherein the pixel color signal represents one of the illumination colors when the color coordinate signal corresponding to said one illumination color represents an intensity value above a predetermined threshold, and the color coordinate signal corresponding to the other illumination color represents an intensity value below said threshold, wherein the pixel color signal represents white when both color coordinate signals represent intensity values above said threshold, and wherein the pixel color signal represents black when both color coordinate signals represent intensity values below said threshold.

21. The scanning method of claim 18, wherein the color of the light alternates between first, second and third illumination colors such that the pixel areas are alternately illuminated with light of the first, second and third illumination colors, and wherein the combining step comprises combining the illumination color signal and intensity signal for each pixel area with the illumination color signal and intensity signal for at least two adjacent pixel areas to provide the pixel color signal for the pixel area.

22. The method of claim 21, further including means for producing three color coordinate signals in response to the intensity signal for each pixel area, the three color coordinate signals representing the intensity signal for the pixel area and the intensity signals for two adjacent pixel areas, and wherein the pixel color signal represents a composite color corresponding to the color that would be produced by combining light of the first, second and third illumination colors in ratios corresponding to the color coordinate signals.

23. The method of claim 22, wherein the pixel color signal represents one of the illumination colors when the color coordinate signal corresponding to said one illumination color represents an intensity value above a predetermined threshold and the color coordinate signals corresponding to the two other illumination colors represent intensity values below said threshold, wherein the pixel color signal represents white when all three color coordinate signals represent intensity values above said threshold, and wherein the pixel color signal represents black when all three color coordinate signals represent intensity values below said threshold.

24. The method of claim 23, wherein the pixel color signal represents a transition color when two of the color coordinate signals represent intensity values above said threshold and the other color coordinate signal represents an intensity value below said threshold, the transition color corresponding to the color that would be produced by combining light of the two illumination colors represented by the two color coordinate signals having intensity values above said threshold.

25. The method of claim 24, further comprising the step of converting pixel color signals representing one of the transition colors to pixel color signals representing white, black or one of the illumination colors.

* * * * *